May 28, 1968    M. E. RALSTON    3,385,351
INTEGRATED ENVIRONMENTAL AIR CONTROL CENTER
Filed May 31, 1966    5 Sheets-Sheet 3
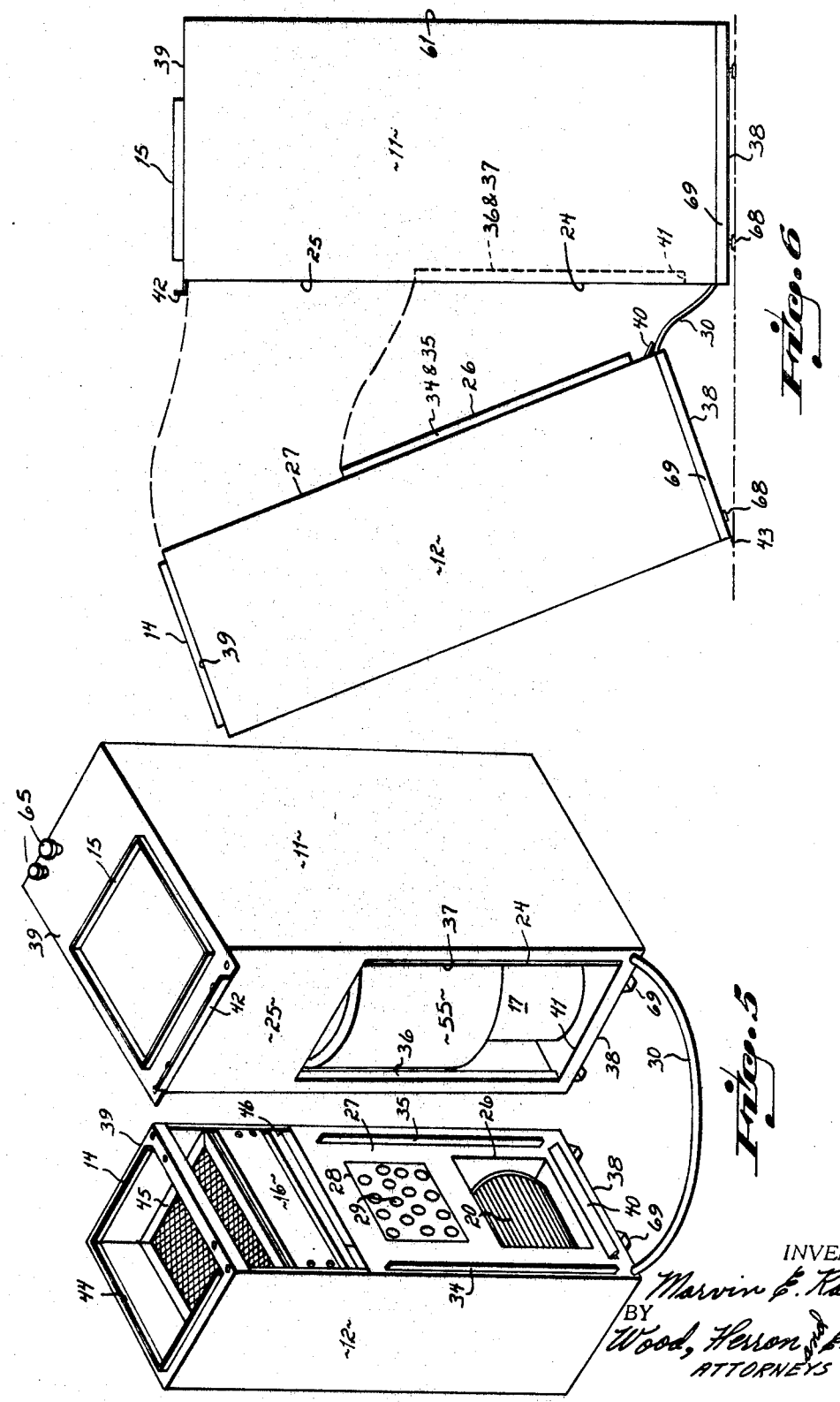
INVENTOR.
Marvin E. Ralston
BY
Wood, Herron and Evans
ATTORNEYS

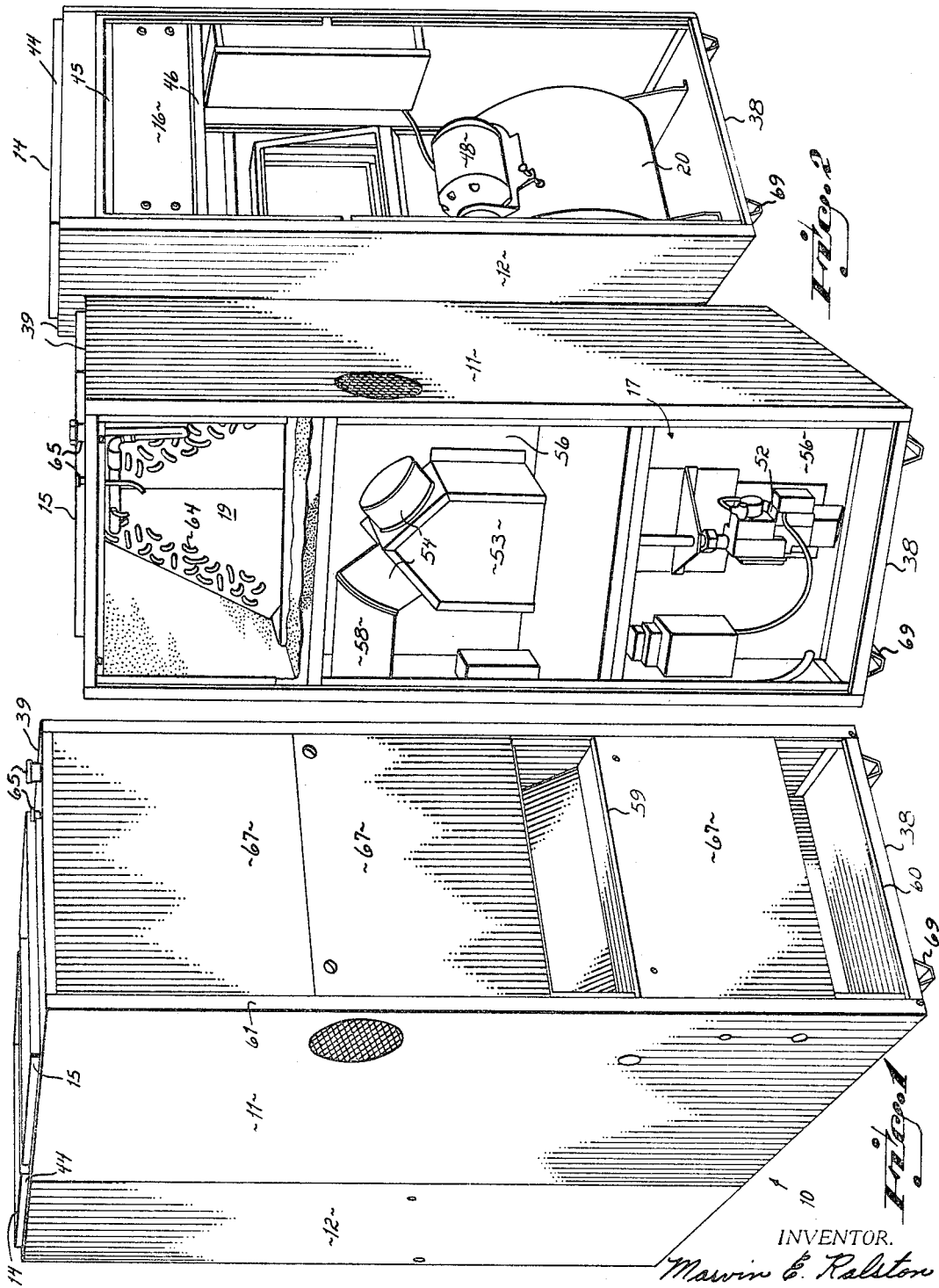

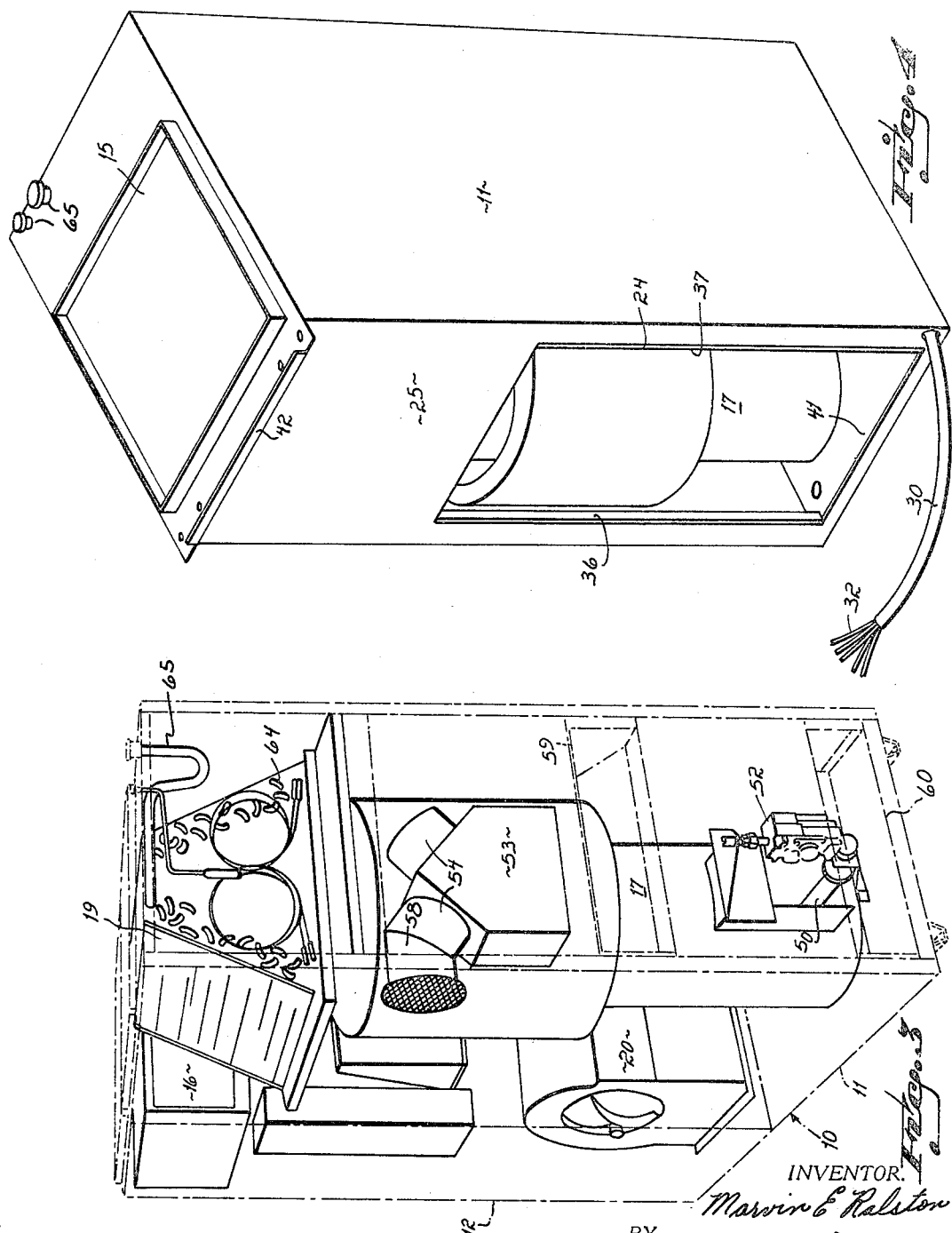

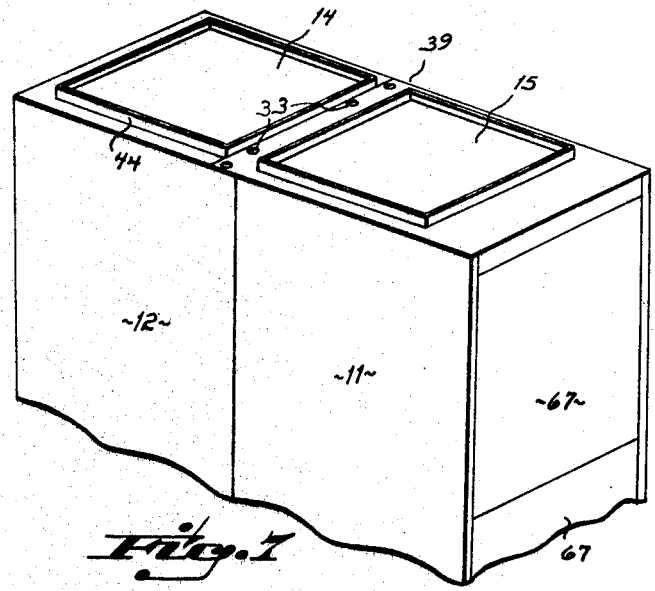
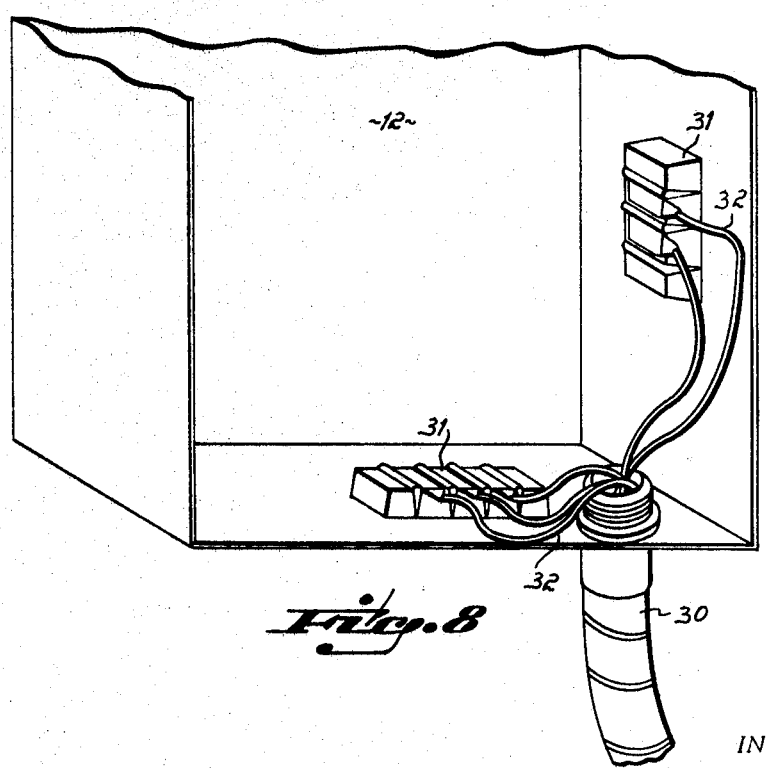

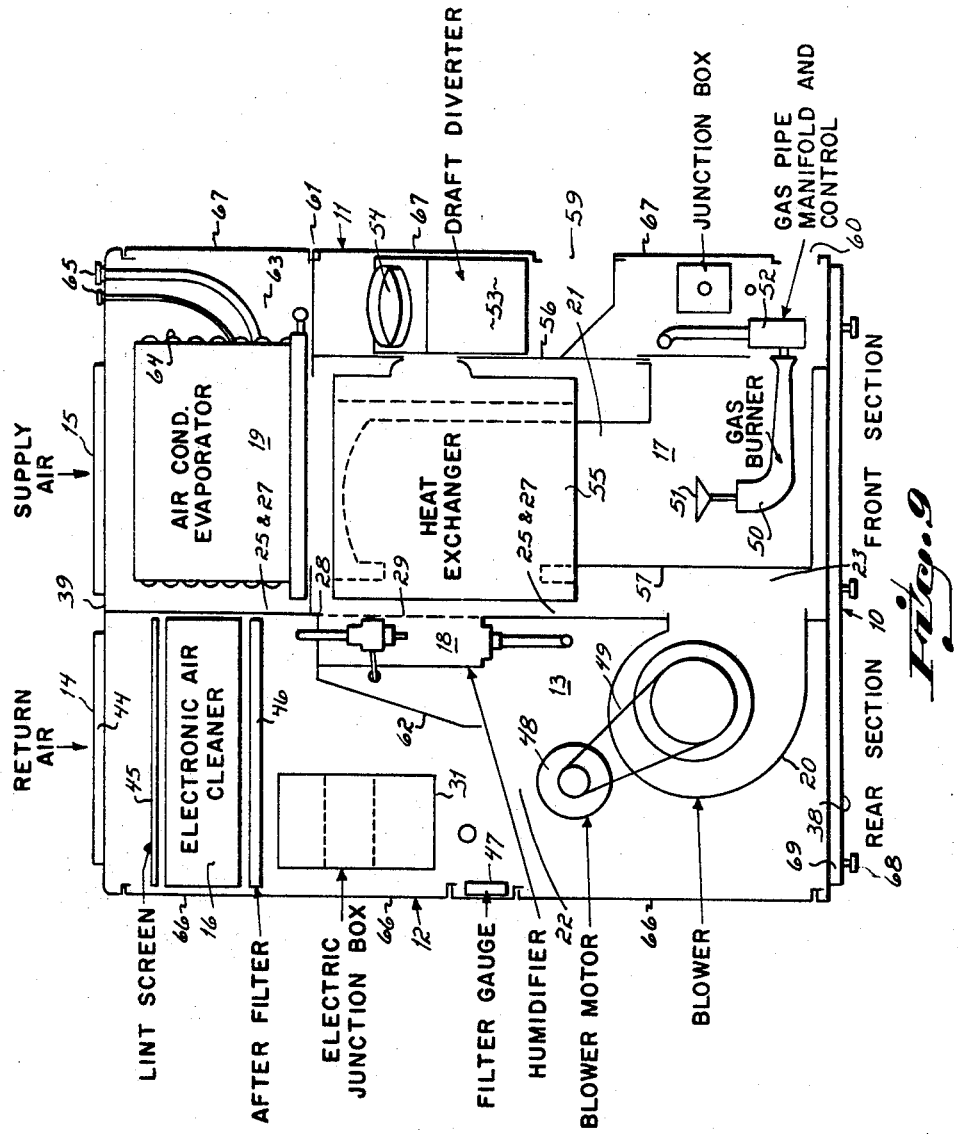

United States Patent Office

3,385,351
Patented May 28, 1968

---

3,385,351
INTEGRATED ENVIRONMENTAL AIR CONTROL CENTER
Marvin E. Ralston, Cincinnati, Ohio, assignor to The Williamson Company, Cincinnati, Ohio, a corporation of Ohio
Filed May 31, 1966, Ser. No. 553,901
5 Claims. (Cl. 165—48)

ABSTRACT OF THE DISCLOSURE

An integrated environmental air control center for conditioning the air in a home during any season of the year that includes, for example, two cabinet halves connectable into a single cabinet unit, a U-shaped air flow chamber defined by the connected cabinet halves, one side of the chamber having an air path opening provided for return air from various rooms of the home and the other side of the chamber having an opening provided for the output of fresh, conditioned air to various rooms of the home, means for fully conditioning the air positioned inside of the cabinet, and means for quickly and effectively interconnecting the two cabinet halves on installation of the air control center.

Background of the invention

This invention relates to apparatus for controlling the air environment inside a home. More particularly, this invention is based upon the concept of providing a central, integrated, single unit that has within it means for completely conditioning the air inside the home.

In the past, it has been the usual practice to use various functional components of an environmental air control system, e.g., an air purifier, a furnace, an air conditioner, and a humidifier, in the form of separate units when conditioning the air in a home. Furnaces have usually been placed in the basement of the home, while air conditioners have generally been manufactured for installation in windows throughout the home. Humidifiers, dehumidifiers and air purifiers have been located, because of their mobility and relatively light weight, in any convenient room in the home, the room selected usually being dependent upon where the greatest effect is desired. Thus, the units required to heat, cool, humidify, dehumidify and purify the air in the home environment, in the past, usually have been separately located in diverse areas throughout the home. Of course, some of the above mentioned units in the home environmental air control system require expert installation. Of even more importance from the home owner's economic standpoint, however, is that each unit requires its own trained expert when repairs and maintenance are needed. In addition, the decentralization of each unit makes for a relatively unsightly house, particularly to the housewife who normally does not like to see her home cluttered with mechanical equipment.

However, the drawbacks and disadvantages of separate, environmental air control units located in different areas throughout the home have been partially recognized and attempts have been made to centralize two or more of the units at a single location. When two or more of the units have been assembled or interrelated at a single location, the practice has been to make the installation in the form of a haphazard mock-up assembly. The mock-ups so installed have required specialized duct work, specialized fittings, and specialized supporting structure, all depending on what units are being installed. Thus, economic problems are also present with the mock-up assemblies, e.g., the plurality of craftsmen needed to install such a mock-up. Sometimes the skills of as many as four different technicians are needed, i.e., a cooling expert, a heating expert, a humidification expert, and a purification expert. Oftentimes, due to the unique hookups that arise in piecing together the units at the installation scene, a pipe or duct fitter is often needed to fabricate the fittings and ducts needed to assemble the various components, and an electrician is often needed to perform the required wiring on the system.

The mock-up assemblies referred to above require many man hours of labor during installation in the home. For example, one or more days of a couple of crafstmen at the installation site is not unusual to completely install such a mock-up. Of course, it is well known that the present day cost of labor, in particular such skilled labor as is required to install the mock-ups above described, is quite high, thereby unduly increasing the installation costs to the homeowner.

Not only are the installation costs of the mock-up assemblies exhorbitant, but the mock-ups themselves are unsightly, bulky, unattractive assemblages as they may convert a great lead of space into waste or unusable area. That is, the various units of the mock-up are merely designed to work together mechanically with no particular thought given to efficient use of the surroundings. The mock-ups are also "dirt catchers," and, therefore, disliked by the housewife. That is, the mock-ups are practically impossible to keep clean with any degree of success as they present a myriad of cracks and crevices in which dirt may collect. This problem is particularly prevalent in homes with no basement where the environmental air control equipment must be located on the ground floor such as, for example, ranch type homes.

While the units which are presently used in assembling the mock-ups, as well as those units designed for use by themselves, are individually smaller than the integrated, one-unit environmental air control center of this invention, the individual units are more difficult to ship and transport when summarily considered. That is, the individual units are usually packed and crated separately, whether or not they are to be installed as separate units or in mock-up assemblies. In addition, some units, e.g., the air conditioning unit of the air purifier, may require specialized, shock absorption type packing when shipped alone. The more packing and protection required, of course, the greater will be the shipping costs and the costlier will be the ultimate home installation. The units making up the integrated air control center of this invention are, on the other hand, already rigidly held in a cabinet because of their cooperative, working relationship therewith. Thus, shipping and transportation costs are kept at a minimum.

Description of the invention

The primary objective of this invention has been to provide an integrated, environmental air control center in which all units necessary to condition the air of a home are assembled in and cooperate with a single cabinet.

Another objective of this invention has been to provide an integrated, environmental air control center having means to condition the air of a home, the means being able to perform the functions of heating, cooling, humidifying, dehumidifying and purifying the environmental air as desired.

A further objective of this invention has been to provide an integrated, environmental air control center having means to completely condition the air of a home, the means cooperating with a chamber at least partially defined by a single cabinet, which chamber controls the direction of flow of the air through the cabinet.

It has been another objective of this invention to provide an integrated, environmental air control center having means to condition the air of a home in a single cabinet that may be installed in the home by unskilled labor, thereby eliminating the need for skilled technicians and lowering installation costs to the homeowner.

It has been a further objective of this invention to provide an integrated, environmental air control center having means to condition the air of a home in a single cabinet that may be simply and easily installed in the home in a very minimum of time, thereby lowering installation costs to the homeowner to an even greater degree.

It has been a further objective of this invention to provide an integrated, environmental air control center having means to completely condition the air of a home in a single cabinet that has all functional units rigidly held therein, thereby providing equipment which requires a minimum of packing or crating and no specialized handling techniques during shipment to the home, which advantage further decreases the ultimate cost to the homeowner.

It has been still a further objective of this invention to provide an integrated, enviromental air control center having means to completely condition the air of a home in a single cabinet, the cabinet not only requiring a minimum of space and lending a nicer appearance to the installation area but also eliminating cracks and crannies where dirt may accumulate, thereby providing equipment which meets with the approval of the housewife.

These and other objects and advantages of the present invention will be more readily apparent from the following detailed description of the drawings which illustrate a preferred embodiment of the invention.

In the drawings:

FIGURE 1 is a front perspective view of the environmental control equipment of this invention showing air intake ports.

FIGURE 2 is a perspective view of each section of the environmental air control equipment with door panels removed.

FIGURE 3 is a front perspective view of the environmental control apparatus, similar to FIGURE 1, showing units in the front and rear sections in operational relationship, but with the cabinet outlined by phantom lines.

FIGURE 4 is a rear perspective view of the front section of the integrated unit showing the only electrical connection between the two sections.

FIGURE 5 is a perspective view of the front and rear sections of the integrated unit interrelated by means of the electrical connection.

FIGURE 6 is a side elevational view showing the preferable manner in which the front and rear sections are placed in operational relationship.

FIGURE 7 is a top perspective view showing the front and rear sections in operational relationship.

FIGURE 8 is a front perspective view of a control box located in the rear section showing the electrical connections between the front and rear sections.

FIGURE 9 is a side diagrammatic view showing the location of the various units in the integrated, environmental air control center of this invention.

As is best seen from FIGS. 1 and 9, the integrated environmental air control center produced according to the principles of this invention is housed within a cabinet 10. The cabinet 10, for ease in handling the apparatus at the manufacturing site as well as at the installation site, is provided as two interlocking halves or sections 11, 12. The insides of the two sections 11, 12, cooperating together, form a U-shaped chamber 13 into which flows the return air from rooms throughout the home and out of which flows the output of fresh, conditioned air back to the rooms of the home. Suitable ductwork is, of course, provided throughout the home to guide the flow of air to and from the chamber 13. The air flow through the chamber 13, which is primarily defined by the sides of cabinet 10, is substantially U-shaped in that the air enters the chamber at return air inlet 14 and exits, after being completely conditioned, at supply air outlet 15, see FIGURE 9.

Operationally related to the U-shaped chamber 13, and located inside the cabinet 10, are the units which perform the various functions on the air that enables it to exit from the supply air outlet 15 of the cabinet 10 in a fresh, completely conditioned state. These components include an air cleaner 16, a furnace 17, a humidifier 18 and an air conditioning evaporator 19, see FIGURE 9. A blower 20 is provided inside the cabinet 10 to cycle the return air from the various rooms of the home through the chamber 13 where it may be completely conditioned by the various functional units, and to cycle the fresh, conditioned air back into the various rooms of the home. A front perspective view of these various units, showing their arrangement inside the cabinet 10, is depicted in FIGURE 3, the cabinet being shown by phantom lines. Therefore, it will be seen that all units which are required to completely condition the air of a house are located within the single cabinet 10, and it will be understood that all the units are rigidly held to the cabinet in a predetermined operating relationship.

As was mentioned, for ease of assembly, installation and transportation, the cabinet is manufactured in two sections 11, 12. The front section 11 contains the furnace 17 and the air conditioning evaporator 19 units, while the rear section 12 contains the air cleaner 16, the humidifier 18 and the blower 20 units. Of course, each of the front 11 and rear 12 sections comprises a portion of the U-shaped chamber 13. Front side 21 of the chamber 13, located in the front section 11 of the cabinet 10, communicates with rear side 22 of the chamber, located in the rear section 12, through an opening 24 in dividing wall 25 of the front section, i.e., through base 23 of the U-shaped chamber. The rear side 22 of the chamber 13 communicates with the front side 21 of the chamber through blower opening 26 in dividing wall 27 of the rear section, i.e., also through the base 23 of the chamber. Because the humidifier 18 is located in the rear section 12 of the cabinet 10, the furnace opening 24 in the dividing wall 25 of the front section 11 also communicates with the rear side 22 of the chamber 13 at this point, but only through wet filter 29 interposed in humidifier opening 28, see FIGURE 5.

Of course, all the various units are secured inside the cabinet 10 at the place of manufacture. This is one reason for the great economy in installation costs of the integrated environmental air control center in the home as well as the reason for improved economy in shipping and transportation cost. Since the cabinet 10 is in a front 11 and a rear 12 section, it is easily handled and carried. The sections 11, 12 are each of a size to permit easy entry through the doors of most any home. Of course, the sections 11, 12 are provided with means to maintain them in operational engagement so that the front side 21 and rear side 22 of the chamber 13 may effectively cooperate together through the base 23 of the chamber.

The two sections 11, 12 are maintained in operative, positive engagement through the use of fasteners 33 (FIGURE 7) and cooperating flanges and lips, thus eliminating the need for skilled labor when intalling the cabinet 10 in a home. As best seen from FIGURES 5 and 6, the two sections 11, 12 of the cabinet 10 are maintained in linear alignment through the cooperation of vertical flanges 34, 35 on the dividing wall 27 of the rear section 12 with the sides 36, 37 of the furnace opening 24 in the dividing wall 25 of the front section 11. The two sections 11, 12 are maintained in the operating position by cooperating means at bottom 38 and top 39 of the cabinet 10. At the bottom 38 of the cabinet 10, the two sections 11, 12 are held in engagement through cooperation of a beveled flange 40 on the rear section dividing wall 27 with base 41 of the furnace opening 24 in the front section dividing wall 25, see FIGURES 5 and 6. A lip 42 projects from the top 39 of the front section 11 and, through cooperation of the lip 42 with the top of the rear section 12, aided by the four screws 33 to keep the lip in place, the two sections are held in a permanent, operating relationship, see FIGURES 4 and 7.

The only electrical connection required between the two sections 11, 12 is a single conduit 30 originating in the front section 11, see FIGURE 4, that must be connected to connector box 31 in the rear section 12. The conduit 30 is passed through corresponding apertures in the front and rear sections, see FIGURE 5. Free end 32 of the conduit is provided with color coded clamp ends so that no skilled electrician is required to effect connection of the free end 32 with the connector box 31, see FIGURE 8.

As best seen in FIGURE 6, the two sections 11, 12 are very easy to connect up, requiring only a minimum of time and effort to effect assembly. The rear section 12 is merely tipped back on its bottom rear edge 43 and positioned so that the beveled flange 40 may engage the base 41 of the furnace opening 24. Then the rear section 12 is permitted to return to a level or normal position whereat the vertical flanges 34, 35 engage the sides 36, 37 of the furnace opening 24, the beveled flange 40 engages the base 41 of the furnace opening, and the lip 42 engages the top surface of the rear section 12. Subsequently, the screws 33 are inserted to maintain the lip 42 in position with the top surface of the rear section 12, and the cabinet 10, with its integrated, environmental air control equipment, is ready for use. Ribs 44 on the top 39 of each section 11, 12 are provided to engage suitable ductwork with the cabinet 10, the ductwork providing communication between the chamber 13 and various rooms throughout the home.

As is best seen from FIGURES 2 and 9, the rear section 12 of the cabinet 10 is provided with easily removable doors 66 to provide ready access to the rear side 22 of the chamber 13, and to the various units located there. The front section 11 of the cabinet 10 is provided with doors 67 giving ready access to the air conditioner evaporator 19, draft diverter 53 and vent openings 54, and the gas burner manifold and controls 52. FIGURE 2 depicts the front 11 and rear 12 sections with the doors 66, 67 removed. Legs 68 of the cabinet 10 have channel-like support structures 69 which carry the adjustable legs 68. The adjustable legs 68 permit the cabinet 10 to be made level on uneven floors.

The various units for conditioning the air form no part of this invention in and of themselves, each of the units being available commercially. However, the arrangement of the units inside the cabinet 10, with respect to the U-shaped chamber 13, will now be described. Although it will be obvious to those skilled in the art that other arrangements are possible, and in some instances may even be desirable, this preferred embodiment has been found to give optimum results after consideration of all relevant factors. Proceeding in the same direction as that of the return air when it is cycled through the cabinet 10, the first unit the return air contacts in the rear side 22 of the chamber 13 is the air cleaner 16. The air cleaner 16 is preferably an electronic air cleaner which generally consists of an ionizing section for charging the dirt particles and a collector section which collects the dirt particles as the air passes through. Immediately prior to the electronic air cleaner 16 is provided a lint screen 45 and immediately after the air cleaner is provided an after filter 46 to catch flakes of dirt that may become dislodged from the collector section of the air cleaner. A visible filter gauge 57 may also be provided in cooperation with the electronic air cleaner 16 to indicate when the collector section becomes overcaked with dirt and needs cleaning. It is to be noted that all return air must pass through the air cleaner 16 as it extends completely across the air flow pattern in the rear side 22 of the chamber 13. Generally, the electronic air cleaner 16 is interrelated with the blower 20 such that it is activated only when the blower is running.

The air, after passing through the electronic air cleaner 16, flows past the enclosed electric connector or junction box 31 and the humidifier 18. The humidifier 18 does not operate on the air to humidify it at this point.

The centrifugal blower 20 draws the return air downwardly through the chamber's rear side 22 by sucking it into the fan chamber and expelling it into the front side 21 of the chamber 13 through blower opening 26 and furnace opening 24. The centrifugal blower 20 is driven by a blower motor 48 through a fan belt 49. The air at this point, i.e., where it enters the front section 11, has been cleaned only.

If it is the winter season, the air is heated by the furnace 17. The furnace 17 may function with either gas, oil, or electricity as the source of heat, though in the embodiment shown in the drawings a gas-type furnace is shown. The furnace 17 includes a gas burner 50, a flame spreader 51, gas burner manifold and controls 52, a heat exchanger 55, a draft diverter 53 and a vent opening 54. The gas burner manifold and controls 52, and the draft diverter 53 and vent openings 54, are separated from the chamber 13 by furnace wall 56, see FIGURE 2.

The air passes around enclosure 57 for the gas burner 50 and up into and through the heat exchanger 55 where it picks up heat, when the furnace 17 is operating. The heat exchanger 55 is also within the chamber 13. Cooperating with the heat exchanger 55 is the draft diverter 53 which has dual vent openings 54 so that it may be connected by ductwork 58 to a flue on either side of the cabinet 10. The vent opening 54 not connected to the flue need merely be capped off.

It will be noted that air openings 59, 60 are provided in front face 61 of front section 11. The air opening 59 communicates with the open bottom of the draft diverter 53 so that additional air may mix with the flue gases prior to their being diverted to the flue. The air opening 60 is provided to permit a mixture of air with the gas at the gas burner 50 so that combustion may be efficiently supported. Of course, the furnace 17 is controlled through a thermostat conveniently located in the home that governs the gas burner controls 52.

It is well known that dry heated air can be detrimental to the health. Therefore, the humidifier 18 has been provided to impart moisture to the air to increase its humidity, as desired. The humidifier 18 presents a water wet filter 29 to the air as some of it flows past, instead of through, the heat exchanger 55, the amount of dampness or water which the filter carries being dependent on the relative humidity desired. The humidifier's principle of operation is that part of the air flows through the wet filter 29 into the rear side 22 of the chamber 13. The wet air flow is deflected by deflector 62 toward the blower 20, which recirculates it through the furnace 17. The operation of the humidifier 18 is controlled by a humidistat which senses the humidity of the conditioned air at a convenient location in the home, thereafter regulating the amount of moisture imparted to the wet filter. Of course, once the air is heated and humidified it passes upwardly through the air conditioning evaporator 19, the evaporator not normally operating in the wintertime, and exits from the supply air outlet 15 as fresh, completely conditioned air to be distributed throughout the home.

In summertime, the furnace 17 is normally off and the air flow merely flows through the heat exchanger 55 without having heat imparted to it. The humidifier 18 is generally inactivated, too, during the summer months, though if the integrated environmental control equipment is to be used in a particularly dry section of the country, it may be left active.

During the summer it is usually desirable to cool and dehumidify the air. For this purpose an A-frame air conditioning evaporator 19 is provided and it is located towards the top of the chamber's front side 21 in a cell 63 which is well insulated. The entire air flow continuously passes through the A-frame evaporator 19, whether or not cooling is desired. The air is cooled by means of a refrigerant present and circulating through suitable piping 64 in the evaporator 19. In the embodiment shown, the refrigerant cycles through the evaporator 19 and out through a condenser assembly, not shown, that is usually located immediately outside the house, to provide peak efficiency in cooling power. Refrigerant line connectors 65 are provided for hooking up the air conditioning evaporator unit 19 with the outdoor condenser assembly.

While there has been described what is at present considered to be the preferred embodiment of this invention, it will be obvious to those skilled in the art that various changes and modifications may be made therein without departing from the concept of this invention, and it is, therefore, aimed to cover all such changes and modifications as fall within the true scope and spirit of the invention.

What I desire to claim and protect by Letters Patent is:

1. In an intergrated environmental air control center having a first cabinet half that includes air filtering means, air humidifying means and blower means, a second cabinet half that includes air heating means and air cooling means, and fastener means for connecting said cabinet halves into an air control center with a substantially U-shaped air flow path, the improvement in said fastener means comprising a downwardly depending locking flange associated with, and positioned toward the bottom of, one of said halves, wall structure associated with the other of said halves and positioned to receive and maintain said locking flange in locking engagement when said halves are joined, a lip associated with the top of one of said halves, said lip positioned to extend over the other of said halves when said halves are joined, and fastener means for connecting said lip to said other half.

2. An improvement as set forth in claim 1 wherein said wall structure and said lip are connected to the same cabinet half.

3. An improvement as set forth in claim 1 wherein said locking flange is substantially horizontal.

4. An improvement as set forth in claim 1 including
at least one alignment flange connected to at least one of said halves, and flange positioning means connected to the other of said halves, said positioning means adapted to coperate with said alignment flange for correctly positioning said halves relative one to the other when said halves are joined.

5. An improvement as set forth in claim 4 wherein said alignment flange is substantially vertical.

References Cited

UNITED STATES PATENTS

| 2,079,562 | 5/1937 | Olson et al. | 165—60 |
| 2,265,272 | 12/1941 | Ditzler | 165—48 |
| 2,292,562 | 8/1942 | Huggins | 165—48 |
| 2,319,062 | 5/1943 | Holmes | 165—76 |
| 2,886,956 | 5/1959 | Loveley | 165—48 |

ROBERT A. O'LEARY, *Primary Examiner.*

CHARLES SUKALO, *Examiner.*